(12) United States Patent
Arellano

(10) Patent No.: US 8,474,866 B1
(45) Date of Patent: Jul. 2, 2013

(54) AIRBAG WITH ZONES OF LESS ELASTIC MATERIAL

(75) Inventor: Nora Arellano, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 13/415,167

(22) Filed: Mar. 8, 2012

(51) Int. Cl.
*B60R 21/16* (2006.01)

(52) U.S. Cl.
USPC ........................................ 280/730.2

(58) Field of Classification Search
USPC ........................... 280/730.2, 743.1
See application file for complete search history.

(56) References Cited

U.S. PATENT DOCUMENTS

| | | | |
|---|---|---|---|
| 6,877,769 B2 * | 4/2005 | Kim et al. | 280/730.2 |
| 7,407,186 B2 | 8/2008 | Rose et al. | |
| 7,469,923 B2 * | 12/2008 | Ryan et al. | 280/730.2 |
| 7,523,956 B2 | 4/2009 | Zumpano | |
| 2001/0035634 A1 | 11/2001 | Breed | |
| 2003/0052477 A1 * | 3/2003 | Challa et al. | 280/730.2 |
| 2005/0057025 A1 * | 3/2005 | Hofmann | 280/730.2 |
| 2005/0082797 A1 * | 4/2005 | Welford et al. | 280/730.2 |
| 2005/0184492 A1 * | 8/2005 | Shilliday et al. | 280/730.2 |
| 2006/0214405 A1 | 9/2006 | Rose et al. | |
| 2006/0249941 A1 * | 11/2006 | Huebner et al. | 280/743.1 |
| 2007/0063490 A1 * | 3/2007 | Minamikawa | 280/728.2 |
| 2008/0048421 A1 | 2/2008 | Breed et al. | |
| 2008/0238055 A1 | 10/2008 | Hotta et al. | |

FOREIGN PATENT DOCUMENTS

DE 20016471 U1 * 2/2001

* cited by examiner

*Primary Examiner* — Faye M. Fleming
(74) *Attorney, Agent, or Firm* — Gifford, Krass, Sprinkle, Anderson & Citkowski, P.C.

(57) ABSTRACT

An airbag is provided that includes one or more rigid regions within a restraint zone that has an elasticity lower than neighboring regions of the airbag. The rigid regions serve to contact the head of an occupant and provide directional support and guidance for the position of an airbag upon deployment or contact with an occupant.

25 Claims, 3 Drawing Sheets

US 8,474,866 B1

AIRBAG WITH ZONES OF LESS ELASTIC MATERIAL

FIELD OF THE INVENTION

The invention relates to devices for passive restraint of a vehicle occupant during a collision. More specifically, airbags are provided that include regions of increased rigidity to target the head or other body part of an occupant improving protective capacity of the airbag.

BACKGROUND OF THE INVENTION

Air bag systems are designed so that the air bag is ideally fully inflated before the occupant contacts the air bag. However, most occupants are not ideally positioned at the location assumed by the air bag system designer. Also, vehicle occupants have greatly varying physical dimensions such as size and weight that complicate airbag positioning during deployment and occupant restraint phases. It is common for many occupants to sit very close to the air bag deployment location(s), which may lead to either ineffective restraint or possible injury from the airbag itself.

For protection against impacts other than from the front of the vehicle, automobiles commonly include airbags that deploy from the side of the occupant. Such airbags are located either in the upper support of the vehicle or from the occupant's seat. Some airbags, termed side curtain airbags, provide cushioning between vehicle occupant(s) and the doors and windows of a vehicle during a lateral impact. Side curtain airbags can extend from a front pillar all the way to the rear of a vehicle, and in vans or sport utility vehicles the airbags can cover not only the front and second row seats, but may also extend back to a third row of seats. The airbags can extend between any designated set of pillars of the vehicle from the front A pillar, B pillar, C pillar to even the D rear pillar of a vehicle.

The airbag size needed to cover a large area requires an excessive amount of inflation gas to fully inflate the bag. To increase deployment speed and reduce the amount of gas necessary, it is common for an airbag to include uninflated zones located at positions that will not contact a vehicle occupant. The presence of these zones may lead to airbag instability that could place the airbag in a less than desirable position to protect an occupant during restraint. Thus, there is a need for improved side airbags that are able to adjust to an occupant's position and provide sufficient directional guidance to most effectively protect an occupant during a collision.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

A side impact airbag is provided whereby the airbag includes one or a plurality of rigid regions within one or a plurality of restraint zones. A rigid region is an inflatable or uninflatable section of an airbag that is formed of a material that has lower elasticity or greater rigidity than neighboring sections of an airbag. The rigid regions are located proximal or in an area of an airbag that is expected to contact the head of an occupant during deployment of the airbag. Additional stability is optionally provided by one or more tethers that are integral to or associated with a rigid region. A tether optionally associates with a pillar or other portion of a vehicle to maintain the position of the rigid region during contact of the airbag with an occupant. The presence of the rigid region(s) improves airbag positional stability and protective capacity relative to prior airbag designs.

DETAILED DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only.

The invention has utility for occupant passive restraint in a vehicle. An airbag is provided that includes one or more rigid regions positioned in the airbag so as to be at or proximal to an occupant's head when the airbag is deployed. A rigid region is defined herein as a region of an airbag that is made from material with lower elasticity than neighboring material used in the construction of neighboring regions of the airbag. It is appreciated that an airbag may include one or more rigid regions. As an illustration, an exemplary side airbag optionally includes one rigid region for each area of the airbag that may contact an occupant's head when the airbag is deployed. A side airbag optionally is designed to protect one, two, three, or more rows of passengers, and as such, optionally includes one, two, three, or more rigid regions within the airbag.

The term "airbag" is defined herein as a chamber partially or fully filled with a gas that acts as a passive restraint for an occupant of a vehicle. The "air" in an airbag is not limited to air, but may be any suitable gas, as will be recognized by one of skill in the art, illustratively nitrogen, helium, or other suitable gas or mixtures of gasses known in the art. While the description is directed to side impact airbags, it is appreciated that the elements of the invention are optionally included in a front airbag, knee airbag, or other airbag as is known in the art.

Figure 1:
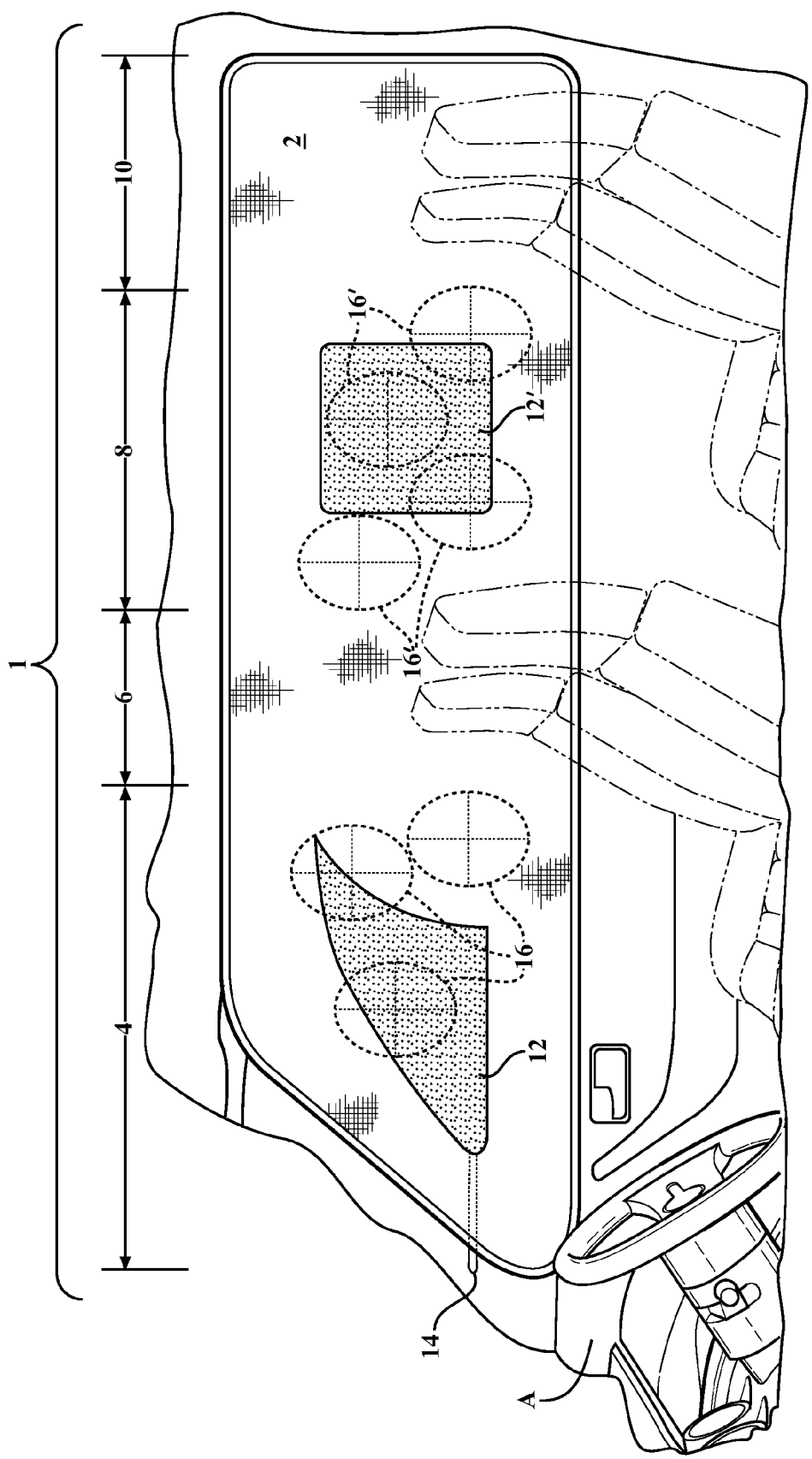
FIG. 1 is an illustration of an airbag according to one embodiment of the invention.

In one exemplary embodiment as depicted in FIG. 1, an airbag 1 is provided that includes a first restraint zone 4, a first pillar section 6, and a first rigid region 12 that is positioned within the first restraint zone 4. The first restraint zone 4 and first pillar section 6 are proximate to one another and optionally connected. The first restraint zone 4 is positioned in the airbag 1 so as to be at or proximal to an occupant's head when said airbag is deployed.

An airbag 1 optionally includes more than one restraint zone, and optionally more than one pillar section. In the side curtain airbag depicted in FIG. 1, a second restraint zone 8 is present in the airbag proximal to the first pillar section 6 opposite the first restraint zone 4. A second restraint zone 8 is operable to provide passive protection to an occupant in a row of seats different than the row protected by the first restraint zone 4. It is appreciated that due to the unique nature of the position of an occupant in a second or third row of seats relative to a first row of seats or each other, the inclusion of a second or additional restraint zone that includes a second or other rigid region is not simple duplication of these elements in an airbag. Each restraint zone encompasses unique attributes dictated by the nature of the vehicle shape, expected size and position of the occupant, and required size and shape of the restraint zone itself. Thus, the recitation of a second or additional restraint zone or rigid region is not mere duplication of a first restraint zone or rigid region.

A restraint zone includes one or more rigid regions 12, 12'. A rigid region 12, 12' is a region of a restraint zone 4, 8 that has lower elasticity than the neighboring material from which an inflatable region of the associated restraint zone is formed. One or more rigid regions are present in a single restraint zone. In some embodiments, a single restraint zone includes no more than one rigid region. In some embodiments, a rigid region 12, 12' is positioned within a restraint zone 4, 8 so as to be contacted in part or in full by the head of an occupant during deployment of an airbag. As such, a restraint zone may serve as a target area for the head of an occupant. A restraint zone of the invention is dimensioned and shaped so as to support the shape of the airbag when contacted by the head of an occupant. FIG. 1 includes within the first restraint zone three headforms 16 in a first restraint zone 4 and four headforms 16' in a second restraint zone 8 that merely indicate three possible locations for the head of an occupant to contact an airbag. The headforms illustrate potential contact points on an airbag for the head of an occupant. The positioning of a rigid region 12, 12' is proximal to, partially inclusive of, or fully inclusive of a portion of an airbag that may contact the head of an occupant as illustrated by a headform.

A rigid region 12, 12' is optionally not centered within a restraint zone. In some embodiments a rigid region is located partially or fully forward of a center of a restraint zone. Optionally a rigid region is located partially or fully above a center of a restraint zone. Optionally a rigid region is located partially or fully above and forward of a center of a restraint zone. Optionally a first rigid region 12 is located forward, above, or both of a center of a first restraint zone, while a second rigid region 12' is located forward, above, or both of a center of a second restraint zone 8. A rigid region may be located below, behind or both of a center of a restraint zone.

A rigid region 12, 12' is in any shape suitable to effectively serve to protect an occupant during deployment of an airbag and to support airbag shaping during contact with a vehicle occupant. In FIG. 1, a rigid region is optionally in the shape of a triangle or irregular triangle as shown at 12, or a rectangle as shown at 12'. These shapes are for illustrative purposes alone and are not meant as a limitation on the shape of a rigid region. Optionally, a rigid region is in the shape of any polygon, curved shape such as circle, oval, irregular curved shape, or other curved shape, linear shape, irregular shape, or combinations thereof that will support the shaping of an airbag during deployment or contact with the head of an occupant. In some embodiments, a rigid region 12, 12' is substantially in the shape of a region of a vehicle proximal to the rigid region when an airbag is deployed. Illustratively, a rigid region is shaped in a triangular or trapezoidal configuration similar to the window in a front door of a vehicle. Optionally, a rigid region is shaped in a square or other rectangular form similar to a window in a rear row of seats in a vehicle. A first, second, third or other rigid region optionally has a different shape, size or other configuration from a rigid region in a neighboring restraint zone.

A rigid region 12 is optionally positioned at the front of an airbag illustratively as depicted at 12, the mid section of an airbag illustratively as depicted as 12', optionally at the rear of an airbag, or other desired position. It is appreciated that one or more rigid regions are present is each restraint zone. Optionally, no more than one rigid region is present in a single restraint zone. The relative positions of the airbag (e.g. front, rear, etc.) are relative to the portions of a vehicle into which an airbag may be installed.

A rigid region optionally has a size that has an area of 210,000 mm$^2$, optionally less than 100,000 mm$^2$. A rigid region is optionally from 50,000 to 250,000 mm$^2$ or any value or range therebetween. A first rigid region is optionally smaller in area than a second or third rigid region. A first rigid region is optionally less than ½ the area of a second or third rigid region. A rigid region optionally has a length overall that is 700 mm or less, optionally from 200 mm to 700 mm, optionally from 200 mm to 500 mm. A first rigid region optionally has a length overall that is lower than that of a second rigid region.

An airbag optionally includes one or more pillar sections 6, 10. A pillar section is defined as a region of an airbag that is not intended to contact an occupant when an airbag is deployed. A pillar section optionally divides two or more restraint zones in an airbag. A pillar section is optionally not inflatable, or not fully inflatable, such as pillar sections described in U.S. Pat. No. 7,261,316. Such a section is known in the art as a sail section that is traditionally made from one or more layers of material that is not inflated when an airbag is deployed. A pillar section is any geometry, size, or other dimension to reduce the amount of air required to inflate an airbag.

Figures 2A, 2B:
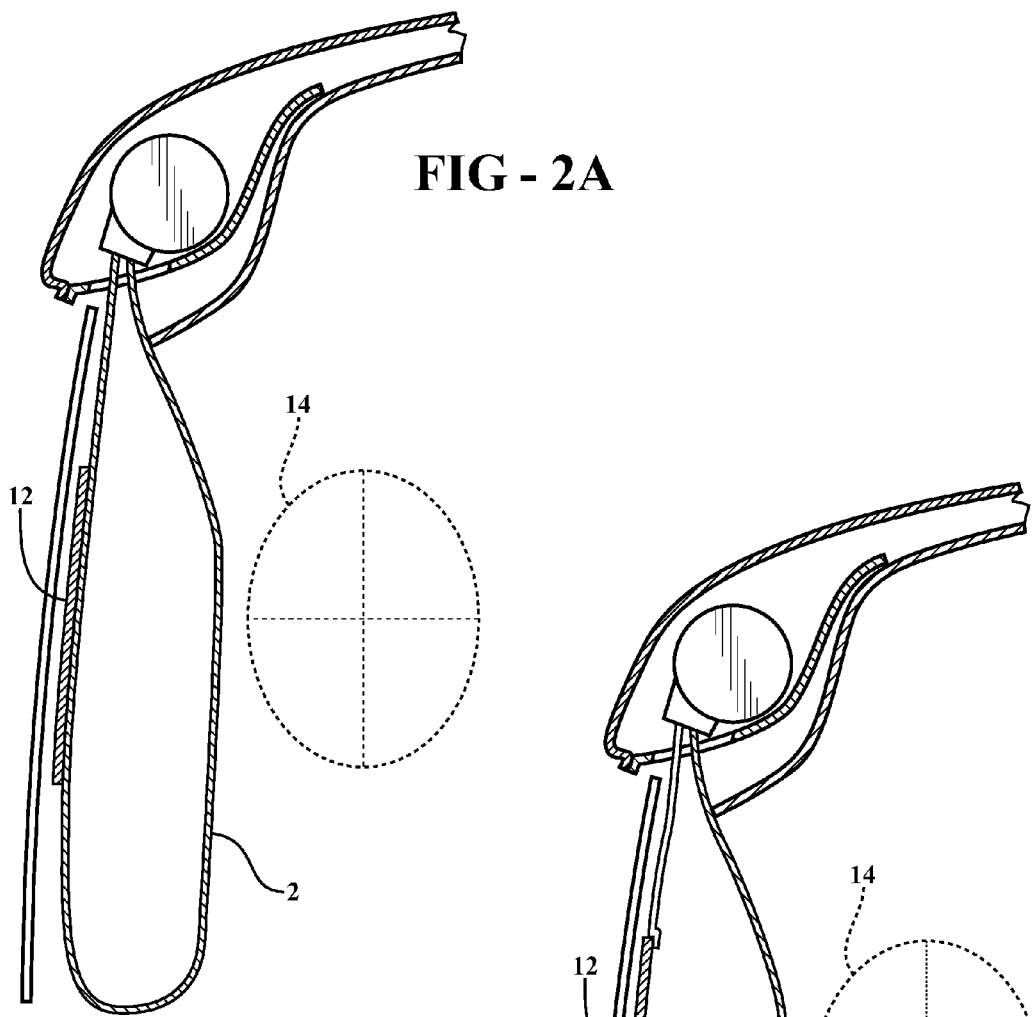
FIG. 2 is an illustration of an airbag viewed from the front end illustrating one embodiment of the positioning of a rigid region as adjacent to an inflatable region (A); one embodiment where a rigid region is integral with a surface of an inflatable region (B); or one embodiment illustrating a non-inflatable rigid region between or surrounded by inflatable region(s) (C)
Figure 2C:
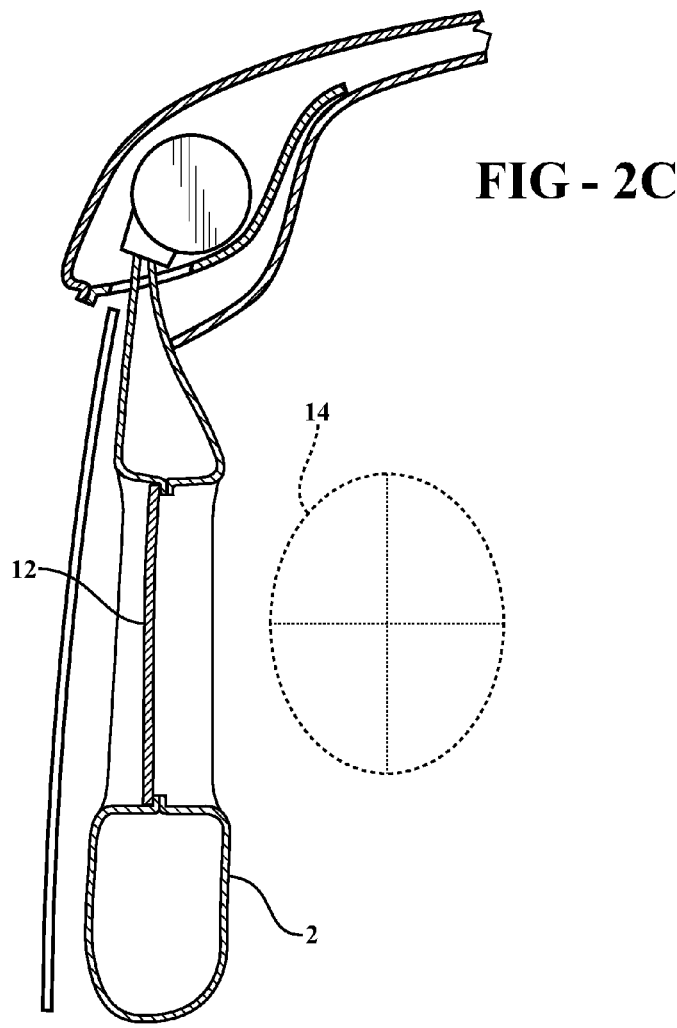

Illustrative alternative embodiments of an airbag are illustrated in FIG. 2 viewed end on from the front of an airbag. A rigid region 12 optionally overlies an inflated region 2 at a restraint zone as depicted in FIG. 2A. In these exemplary embodiments, the rigid region 12 is optionally positioned distal to an occupant, proximal to an occupant, or both. The distal positioning of the rigid region places the material used to form the rigid region between the inflated region 2 and the vehicle body or window. In embodiments that include a rigid region proximal to an occupant, the rigid region 12 is positioned on the airbag at a location that is to be between the occupant and the inflated region 2. A rigid region is optionally integral with the surrounding material of an airbag such as by connection formed by sewing, adhesive, or other method of associated two materials. An illustrative embodiment of a rigid region integral with the surrounding airbag material is depicted in FIG. 2B. The rigid region 12 is depicted as distal from an occupant for illustrative purposes alone. In some embodiments the rigid region 12 is located on the face of an airbag that is proximal to an occupant. As depicted in FIG. 2C, a rigid region 12 is optionally an uninflatable portion of an airbag that is between or surrounded by inflatable portions of the restraint zone.

Figure 3:
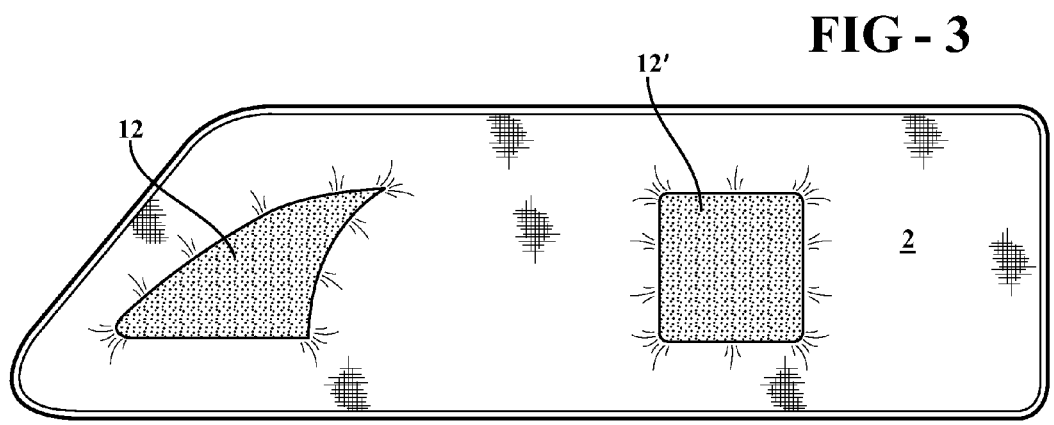
FIG. 3 is an illustration of an airbag with two rigid regions that are not inflated when the airbag is deployed according to one embodiment of the invention.

In some embodiments, a rigid region is not inflatable so as to remain uninflated when an airbag is deployed. A rigid region is optionally located in a restraint zone so as to be surrounded or substantially surrounded by an inflatable region. An illustrative example of one embodiment of an uninflatable rigid region 12, 12' in an airbag is depicted in FIG. 3. A rigid region 12, 12' optionally forms an uninflated portion to a restraint zone.

A rigid region is formed of a material with lower elasticity relative to neighboring portions of an airbag. A material of lower elasticity is one with a higher relative elastic modulus (e.g. Young's modulus). A rigid region is optionally formed of the same material or alternative material to neighboring portions of an airbag as long as the rigid region has lower elasticity. In some embodiments, a rigid region is made from the same material as neighboring portions of an airbag, whereby the reduced elasticity is created by altering the thickness, direction of weave, or other parameter of the material of the rigid region. Optionally, a rigid region is made from a material that is different from that of neighboring portions of an airbag where the reduced elasticity is provided by differing characteristics of the differing materials. In some embodiments, a rigid region is not formed of two or more layers of the same material as neighboring sections of an airbag. In some embodiments, the rigid regions are formed from the same material as neighboring sections, but the additional rigidity is achieved by increased thread count of the material in the rigid regions, inclusion of interwoven or interspersed threads of more rigid material, the presence of a coating, or combinations thereof. Illustratively, an airbag is formed of material with a 46×46 thread count (420 denier), with a rigid region formed of material that is a 41×41 thread count (630 denier) providing increased rigidity to the rigid regions. Illustrative materials include polyesters, aramids, polyamides, polyurethanes, liquid crystal polymers such as those described by Chen in U.S. Pat. No. 6,627,275, or other thread types woven or otherwise used to form an airbag material, or combinations thereof. In some embodiments, a rigid region is formed of the same or differing material as the neighboring sections, but includes a coating that is either absent or is different in thickness or other property if present on neighboring regions. For example, in some embodiments a rigid region includes material with a silicone liquid elastomer (SLE) coating such as a liquid vinyl chain-stopped polysiloxane, or other materials such as those disclosed in U.S. Pat. No. 4,666,765. A rigid region is optionally 1 or more percent less elastic than neighboring regions of an airbag. Optionally, a rigid region is 1, 2, 3, 4, 5, 6, 7, 8, 9, 10, 15, 20, 50, 75, 100, 200, 300, or more percent less elastic than neighboring regions of an airbag, or any value or range between 0.001 percent and 500 percent.

A rigid region is optionally associated with an airbag such as by stitching, use of an adhesive, other method known in the art, or combinations thereof. In some embodiments, a rigid region is associated with a restraint zone by stitching. The stitching, adhesive, or other, is optionally of suitable strength to maintain the position of the rigid region relative to the remainder of the restraint zone during contact by an individual. Adhesive, stitching, or other materials suitable for use are known in the art.

A rigid region provides increased tension in the portion of the restraint zone that is contacted with the head of an occupant during deployment of the airbag. This increased tension serves to orient the position of the airbag relative to the occupant's head to improve the protective characteristics of the airbag. The presence of a rigid region may also promote wrapping of an inflated region in a restraint zone around an occupant to improve airbag performance.

A rigid region optionally includes one or more tethers as depicted in FIG. 1 at 14. A tether 14 is optionally positioned so as to fixedly contact a pillar. In some embodiments, a tether is positioned to fixedly contact a pillar of a vehicle, optionally an A, B, C, D or other pillar. A tether is optionally positioned to fixedly contact a roof section of a vehicle. Optionally, a plurality of tethers are used. Optionally, each rigid region includes 1, 2, 3, 4, or more tethers. Optionally, no more than one tether is associated with a rigid region. Optionally, only a front positioned rigid region includes a tether. Optionally, a second rigid region does not include a tether. The presence of a tether increases the stability provided to the airbag by the rigid region. A tether is made of any suitable material such as synthetic polymeric materials suitable to resist tear or break during restraint of an occupant. In some embodiments, a tether is integral with a rigid region such that the tether and the material of the rigid region are the same and are continuous. Optionally a tether is a portion of a rigid region that fixedly contacts a portion of a vehicle such as a pillar.

It is appreciated that elements of an airbag described herein can be arranged in numerous configurations. The configurations described herein are for illustrative purposes alone and are not meant to be a limitation on the scope of the invention. Elements of one rigid region, restraint zone, pillar section, or combinations thereof are illustratively interchangeable with other or additional rigid regions, restraint zones, or pillar sections.

Various modifications of the present invention, in addition to those shown and described herein, will be apparent to those skilled in the art of the above description. Such modifications are also intended to fall within the scope of the appended claims.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A side airbag comprising:
 a first restraint zone, said zone positioned in said airbag so as to be at or proximal to an occupant's head when said airbag is fully deployed;
 a first pillar section connected to said first restraint zone and adjacent thereto, said pillar section positioned in said airbag so as to be remote from an occupant's head when said airbag is fully deployed;
 a first rigid region, said rigid region positioned within said first restraint zone and associated with said first restraint zone, said first rigid region comprising material having lower elasticity than neighboring first restraint zone material.

2. The airbag of claim 1 wherein said rigid region is not centered within said first restraint zone.

3. The airbag of claim 2 wherein said rigid region is forward of a center of said first restraint zone.

4. The airbag of claim 2 wherein a contact point for an occupant's head overlaps with a portion of said first rigid region.

5. The airbag of claim 1 wherein said air bag further comprises a second restraint zone, said second restraint zone comprising a second rigid region.

6. The airbag of claim 1 wherein said first rigid region is positioned within said first restraint zone at a position operable to contact an occupant's head when said airbag is deployed.

7. The airbag of claim 1 wherein said first restraint zone is at a front end of said airbag.

8. The airbag of claim 1 wherein said first restraint zone further comprises a tether.

9. The airbag of claim 8 wherein said tether is positioned in said region so as to contact a pillar of a vehicle when installed in said vehicle.

10. The airbag of claim 5 wherein said first rigid region and said second rigid region are different shapes.

11. The airbag of claim 1 wherein said first rigid region is not inflated upon airbag deployment.

12. The airbag of claim 1 wherein said first rigid region overlies an inflatable region in said airbag.

13. The airbag of claim 10 wherein said first rigid region is positioned on a distal side of said airbag.

14. The airbag of claim 12 wherein said first rigid region is positioned on a proximal side of said airbag.

15. The airbag of claim 1 wherein said first rigid region is associated with said airbag by stitching.

16. The airbag of claim 5 wherein said first rigid region and said second rigid region are associated to said airbag by stitching.

17. The airbag of claim 1 wherein said first rigid region is sized to provide tension on said first restraint zone upon inflation.

18. A side airbag comprising:
   a first restraint zone, said zone positioned in said airbag so as to be at or proximal to an occupant's head when said airbag is fully deployed;
   a first pillar section, said pillar section positioned in said airbag so as to be remote from an occupant's head when said airbag is fully deployed;
   a first rigid region, said rigid region positioned within said restraint zone, said first rigid region comprising material having lower elasticity than neighboring first restraint zone material, said first rigid region further comprising a tether positioned in said region so as to be capable of contacting a pillar of a vehicle.

19. The airbag of claim 18 wherein said air bag further comprises a second restraint zone, said second restraint zone comprising a second rigid region.

20. The airbag of claim 18 wherein said first rigid region is positioned within said first restraint zone at a position operable to contact an occupant's head when said airbag is deployed.

21. The airbag of claim 18 wherein said first rigid region is not inflated upon airbag deployment.

22. A side airbag comprising:
   a first restraint zone, said zone positioned in said airbag so as to be at or proximal to an occupant's head when said airbag is fully deployed;
   a first pillar section connected to said first restraint zone and adjacent thereto, said pillar section positioned in said airbag so as to be remote from an occupant's head when said airbag is fully deployed;
   a first rigid region, said rigid region positioned within said restraint zone and associated therewith, said first rigid region comprising material having lower elasticity than neighboring first restraint zone material, said first rigid region positioned within said first restraint zone at a position operable to contact an occupant's head when said airbag is deployed.

23. The airbag of claim 22 wherein said airbag further comprises a second restraint zone, said second restraint zone comprising a second rigid region, said second rigid region positioned within said second restraint zone at a position operable to contact an occupant's head when said airbag is deployed.

24. The airbag of claim 22 wherein said first restraint zone further comprises a tether, said tether positioned on said region so as to contact a pillar of a vehicle when said airbag is deployed in said vehicle.

25. The airbag of claim 22 wherein said first rigid region is not inflated upon airbag deployment.

* * * * *